United States Patent Office 3,236,451
Patented Feb. 22, 1966

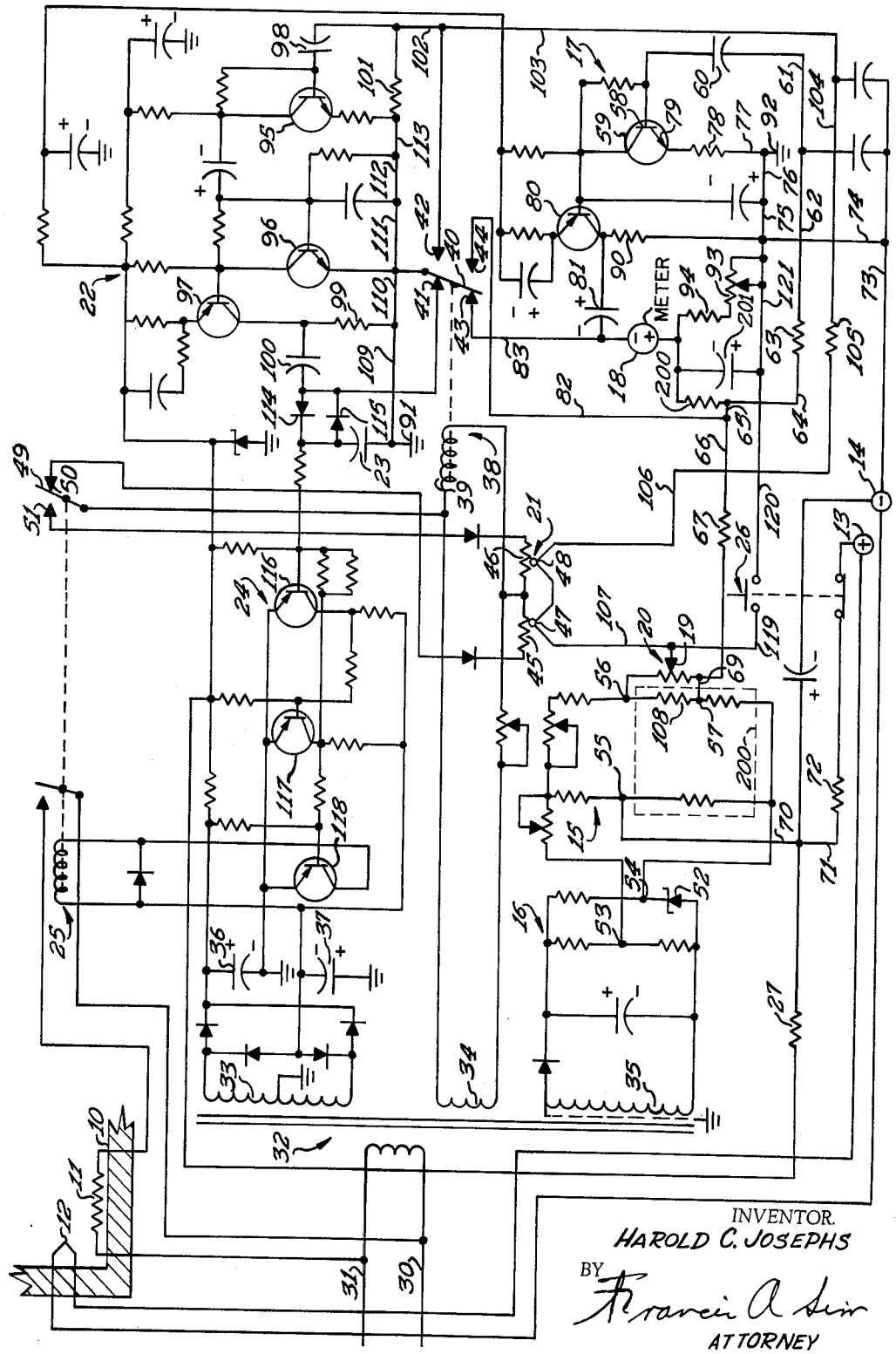

3,236,451
THERMOCOUPLE INDICATION AND
CONTROL APPARATUS
Harold C. Josephs, Plymouth, Minn., assignor to
Honeywell Inc., a corporation of Delaware
Filed May 8, 1963, Ser. No. 278,891
7 Claims. (Cl. 236—68)

This invention is concerned with an improved thermocouple indication and control apparatus and particularly with an apparatus of this type which can be characterized as a potentiometer controller in which an indication of the temperature to which a thermocouple junction is exposed is provided at a meter display.

This meter display is associated with an electrical network in a manner to provide an indication which is operationally isolated from the control portion of the apparatus, the control portion and the meter portion having certain common elements facilitating simplification of the electrical circuit and facilitating a unique manner of providing control set point adjustment of the control portion of the apparatus, with the set point being momentarily displayed on the meter as adjustment is made. My unique construction is such that, while the meter may be selectively adapted to read control set point of the control portion at any given time, a release of this function causes the meter to again be operationally isolated from the control portion and to accurately display the temperature of the sensing thermocouple, independent of the position of the control set point adjustment.

As a further feature of my invention, in combination with the structure generally above defined, I provide a temperature anticipation construction which includes a pair of thermocouple junctions and associated heaters, with the magnitude and sense of energization of the heaters being controlled to thereby proportion the on and off cycling time of the control portion of my apparatus, it being recognized that this construction provides variable temperature anticipation to stabilize and contribute to the accuracy of the control to be achieved.

A further feature of my invention includes, in combination, a thermocouple burnout protection circuit which not only causes the control portion of my invention to assume a safe state of operation, but also causes the indicating meter to move to a position indicating a high temperature condition in the case of such a thermocouple malfunction.

My invention will be apparent to those skilled in the art upon the reference to the following specification, claims, and drawing, of which the single figure is a schematic representation of a circuit embodying my invention.

Referring to the single figure, reference numeral 10 designates generally a portion of the wall of an enclosure adapted to be heated by an electrical heating element 11. A thermocouple junction 12, specifically a hot sensing junction, is located within the space defined by wall 10 and is subjected to the temperature therein to control energization and deenergization of heater 11.

Considering first the basic elements disclosed, thermocouple hot junction 12 is connected to a pair of terminals 13 and 14, designated + and — respectively, to indicate the polarity of the D.C. voltage derived from hot junction 12 and from a cold junction formed at terminals 13 and 14. The cold junction, which is connected to hot junction 12 to form a thermocouple, exists at terminals 13 and 14 and is physically located in the vicinity of a bridge circuit identified generally by means of reference numeral 15.

This bridge circuit 15 is energized from a D.C. source of regulated voltage 16. The voltage at thermocouple terminals 13 and 14, of the polarity indicated, is connected in series to an opposition voltage derived at one of two outputs which are provided at bridge circuit 15. Furthermore, certain of the impedance elements which constitute portions of bridge circuit 15, as located within broken line 200, are temperature sensitive to provide ambient temperature compensation for the cold thermocouple junction included within the bridge circuit. Furthermore, these circuit elements can also be changed, as by the use of a circuit card element, to change the range of operation of the apparatus.

The bridge circuit is constructed and arranged to provide a first output across terminals 55 and 57, which output is connected to the input of a meter-drive Class A amplifier, identified generally by means of reference numeral 17. The output of amplifier 17 is provided at a D.C. indicating meter 18, which may be calibrated to indicate the temperature to which the hot junction 12 is subjected. Meter 18 may be a conventional D.C. meter having a scale beginning at a zero reading and being calibrated up scale from zero, to read in increasing degrees of temperature.

Bridge circuit 15 is constructed and arranged to provide a second output, of a manually variable magnitude, across terminal 55 and a movable tap 19 of a control set point potentiometer 20. Movable tap 19 is utilized to set the temperature to which the enclosure within wall 10 is to be maintained by heater 11. Resistor 103, which shunts the resistance element of potentiometer 20, is of relatively low resistance value such that the voltage present across the resistance element of potentiometer 20 does not vary as tap 19 is moved along the resistance element. This second output is connected through an anticipation network 21 to the input of a three stage Class A control amplifier 22. The output of the amplifier 22 exists at a capacitor 23. This output, as will be described, is of a first or a second characteristic dependent upon the temperature of the zone being heated, as this temperature compares to the control point temperature which has been selected at control point potentiometer 20.

Capacitor 23 is connected to the input of a Schmitt trigger circuit, identified generally by means of reference numeral 24. The output of the Schmitt trigger circuit consists of switching means in the form of a relay 25 having switch means connected in controlling relation to the electrical heater 11, and having switch means connected in controlling relation to circuit elements of the anticipation network 21.

It is recognized that the output provided at capacitor 23 can be connected to control switching means in the form of a silicon controlled rectifier, for example, either directly or through the Schmitt trigger.

Reference numeral 26 identifies generally a push-to-set manual switch. Switch 26 is effective to disconnect the thermocouple hot junction 12 from the input of the meter drive amplifier 17, and to connect, in place thereof, a portion of the set point potentiometer 20. The portion so connected is that portion from terminal 57 to tap 19. In this manner indicating meter 18 visually indicates the control point temperature to which the control point potentiometer 20 is set. Upon release of switch 26, meter 18 again indicates the temperature to which the hot junction 12 is subjected. The position of the tap of control point potentiometer 20, through the control of amplifier 22 and Schmitt trigger 24, is effective to control relay 25 in a manner to maintain the selected temperature at the hot junction.

Reference numeral 27 identifies a thermocouple burnout protection resistor which is connected to a source of positive voltage, as will be described, and which is effective, upon a burnout of the thermocouple hot junction 12, to apply a positive voltage to the input of the amplifiers 17 and 22 respectively to cause meter 18 to indicate a high temperature condition and to cause relay 25 to remain deenergized to prevent overheating of the enclosure being heated.

Turning now to a more detailed description of the device embodying my invention, electrical operating voltage for the apparatus is supplied from a pair of power line conductors 30 and 31, adapted to be connected to a source of alternating voltage, not shown. These power line conductors are connected to the primary winding of a transformer 32, having the secondary windings 33, 34 and 35.

Secondary winding 33 is effective, by virtue of associated rectifying elements, to provide sources of D.C. supply voltage, of the polarity indicated, at the capacitors 36 and 37.

Secondary winding 34 is associated with a continuously cycling switch means 38 in the form of a chopper, having an actuating winding 39 and a movable switch blade 40 associated with the stationary switch contacts 41, 42, 43 and 44. As will be apparent, the cycling switch means 38 is effective to cyclically chop the input and the output of amplifiers 17 and 22.

Secondary winding 34 also supplies energizing voltage to heaters 45 and 46 which are associated with thermocouple junctions 47 and 48 respectively, these components forming anticipation network 21. Selective and alternate energization of heaters 45 and 46 is controlled by relay 25, and specifically by means of a movable switch blade 49 of this relay which cooperates with stationary switch contacts 50 and 51. As shown, with switch blade 49 engaging contact 50, heater 45 is energized and heater 46 is deenergized, thus causing thermocouple junction 47 to be a hot junction and thermocouple junction 48 to be a cold junction. Energization of relay 25 is effective to deenergize heater 45 and to energize heater 46, thus causing thermocouple junction 48 to be a hot junction, while thermocouple junction 47 is the cold junction. As will be appreciated, the polarity of D.C. output voltage provided by the thermocouple 47–48, at conductors 106 and 107, is reversed by the selective energization and deenergization of the heaters. Since operation of relay 25 is effective to energize or deenergize heater 11 associated with the space to be heated, the anticipation network 21 is effective, by virtue of the reversible polarity D.C. voltage achieved by selective energization and deenergization of heaters 45 and 46, to provide an anticipation voltage effect, to anticipate the voltage change which will occur at the thermocouple terminals 13 and 14 by the virtue of the energization or deenergization of heater 11.

The secondary winding 35 of transformer 32 is effective, by means of associated rectifying elements and by means of a Zener diode 52, to provide a regulated D.C. energizing voltage at terminals 53 and 54 to energize bridge circuit 15. Terminal 54 is of a positive polarity with respect to terminal 53.

As above mentioned, bridge circuit 15 provides two outputs, one at 55–57 and the second at 55–19. The circuit components of bridge 15 are selected so that the voltage of the first output (55 to 57) is a voltage rise from terminal 55 to terminal 57. The voltage of the second output (55 to 19) is a voltage drop from terminal 55 to tap 19. As can be seen, the voltage of the second output is in essence the above described voltage rise of the first output (55 to 57) connected in series opposition to the voltage drop which exists from terminal 57 to tap 19. This last mentioned voltage drop (57 to 19) is of a variable magnitude as determined by the control point setting.

To more completely explain the interaction of the measuring thermocouple and the bridge circuit, consider that junction 12 is at ambient or room temperature and that tap 19 is set to require a heating of the area within wall 10 to a temperature above room temperature. With junction 12 at room temperature, there is no voltage developed across junctions 13 and 14, it being remembered that with the hot and cold junction at the same temperature, no voltage is generated by the measuring thermocouple. In this case, the input to the meter drive amplifier 17 consists of the above described voltage rise from terminal 55 to terminal 57. Also, the input to the control amplifier 22 is as this time the above described voltage drop from terminal 55 to tap 19. As will be described in detail, relay 25 is thus energized to in turn energize heater 11. As the temperature of junction 12 increases as a result of energization of heater 11, thermocouple voltage appears at terminals 13 and 14 of the polarity indicated. This voltage is a voltage rise from terminal 14 to terminal 13, and aids the bridge output 55 to 57 (also a rise), while it opposes the bridge output 55 to 19 (a drop). As a result, meter 18 reads the new temperature of junction 12, which is now higher than room temperature. As the temperature of junction 12 continues to increase, meter 18 continues to read higher and higher temperatures. As the setting temperature of tap 19 is approached, a point is reached, as determined by the operating differential of the system, where the voltage rise from 14 to 13 is approximately equal and opposite to the voltage drop from 55 to 19. Relay 25 is then deenergized.

To read the control point setting temperature on meter 18, or to change this setting, push-to-set switch 26 is actuated. Switch 26 is effective to connect the portion of set point potentiometer from terminal 57 to tap 19 to the input of meter amplifier 17. This portion of the set point potentiometer is connected such that the voltage from tap 19 to terminal 57 appears as a voltage rise and causes meter 18 to read up scale to the temperature indicative of the setting of tap 19. If it is desired to change this setting (to change the temperature maintained by heater 11) tap 19 is moved and the meter is observed to move to the desired new control temperature. Release of switch 26 again places tap 19, and its associated circuitry, in control of relay 25.

Considering now meter drive amplifier 17, the input circuit from this amplifier can be traced from ground connection 92 through conductors 76, 75, 74, and 73, thermocouple terminals 14 and 13, push-to-set switch 26, resistor 72, conductors 71 and 70, bridge output terminals 55 and 57, conductor 69, resistor 67, conductors 66, 65, 64, resistor 63, conductors 62 and 61, capacitor 60, base 58 and emitter 79 of transistor 59, resistor 78 and conductor 77 back to ground connector 92.

In this above traced circuit, the D.C. voltage provided by the measuring thermocouple is added to the output voltage at terminals 55 and 57 of bridge circuit 15. The magnitude of current which flows as a control current for transistor 59 is a measure of the temperature within the zone confined by wall 10. Thus, an output collector-emitter current flows from transistor 59 of a magnitude indicative of this temperature. This output current, in turn, controls the input circuit to a further transistor 80 to apply a D.C. voltage through capacitor 81 and cycling switch means 38 to energize indicating meter 18. Meter 18 then reads the temperature within wall 10.

Cycling switch means 38, and its associated movable blade 40 and stationary switch contacts 43 and 44, provides a square wave D.C. voltage at both the input and at the output of amplifier 17.

Considering first the input of amplifier 17, the junction of conductors 65 and 66 is connected to stationary contact 44 through conductor 82. With switch means 38 in the position shown, a positive input signal (the above mentioned voltage rise) is supplied through capacitor 60 to the base electrode 58 of transistor 59. The magnitude of this positive input voltage is determined, in part, by the magnitude of the voltage present between thermocouple terminals 13 and 14, and thus this magnitude is indicative of the temperature of the space within wall 10. Transistors 59 and 80 are Class A operated amplifier stages and the positive voltage present at the base electrode of transistor 59 causes an increase in output current of this transistor, this in turn causing an increase in output current of transistor 80.

Resistor 90 is a load resistor for transistor 80 and an increasing current through the output electrodes of transistor 80 causes the upper terminal of this resistor to become more positive. This more positive voltage is applied as a positive square wave of voltage to charge capacitor 81 through a circuit which can be traced from the upper terminal of resistor 90 through capacitor 81, conductor 83, switch 43–40, ground terminal 91, ground terminal 92, and conductors 76 and 75 to the lower terminal of resistor 90.

Considering now the alternate position of switch means 38, in this position the input of amplifier 17 is grounded at the junction of conductors 65 and 66, through the switch 44–40. The output of amplifier 17, that is the now charged capacitor 81, is connected to discharge through meter 18, by way of a circuit which can be traced from the right hand plate of capacitor 81 (charged positive) through resistor 90, potentiometer 93 and resistor 94 in parallel with capacitor 201 and meter 18 to the left hand plate of capacitor 81.

From the above description, it can be seen that the cycling switch means 38, when in the position shown, is effective to cause input capacitor 60 to charge by virtue of the thermocouple voltage and the voltage of bridge 15 and to cause output capacitor 81 to charge by virtue of the output of amplifier 17. During the alternate phase of operation of the cycling switch means 38, the input of amplifier 17 is grounded to discharge capacitor 60 in preparation for a further recharging of this capacitor by virtue of the input signal to the amplifier during the succeeding alternating of the switch means 38. Furthermore, during this alternate phase of operation, output capacitor 81 of the amplifier is discharged through the indicating meter 18 and through capacitor 201. As a result, meter 18 is effective to indicate the temperature of the area within wall 10.

Also, a degenerative feedback circuit is provided for circuit stability by virtue of a circuit including capacitor 201 and resistor 200. The above traced discharge circuit for capacitor 81 is effective to energize meter 18 and to charge capacitor 201 by virtue of the voltage developed across potentiometer 93 and resistor 94 as capacitor 81 discharges. The charge on capacitor 201 is then effective to provide degenerative feedback (that is feedback current flow to oppose the above described charging of capacitor 60 by the thermocouple-bridge circuit network) through a circuit which can be traced from the positive plate of capacitor 201 through conductors 121, 75, 76 and 77, resistor 78, the emitter to base circuit of transistor 59, capacitor 60, conductors 61 and 62, resistor 63, conductor 64, and resistor 200 to the negative plate of capacitor 201.

Considering now the operation of the control portion of my apparatus, control amplifier 22 includes three transistors 95, 96 and 97. Transistor 95, and particularly capacitor 98, constitute the input of the amplifier, while transistor 97, and particularly its load resistor 99, and capacitors 100 and 23 constitute the output of the amplifier.

The input signal to control the input of control amplifier 22 is developed across a resistor 101 which is in parallel with the base to emitter circuit of transistor 95. This can be seen by tracing a circuit from the left hand terminal of this resistor through conductors 113, 112, 111, 110, and 109, ground connectors 91 and 92, conductors 76, 75, 74 and 73, thermocouple terminals 14 and 13, push-to-set switch 26, resistor 72, conductors 71 and 70, bridge output at terminal 55 and tap 19, conductor 107, thermocouple junctions 47 and 48, conductor 106, resistor 105, and conductors 104, 103 and 102 to the right hand terminal of resistor 101. Since the temperature within wall 10 may be above or below the control point setting temperature of potentiometer 20, the voltage developed across resistor 101 may be either a voltage rise or a voltage drop. Considering the polarity of this voltage as being established from the right hand terminal of this resistor to the left hand terminal, this voltage will be a voltage rise if the temperature within the walled area 10 is above the set point, and will be a voltage drop if the temperature within this area is below the set point. As will be appreciated, if the temperature is above the set point (a positive voltage or a voltage rise), no operation of relay 25 is desired. However, if the voltage is below the set (a negative voltage or a voltage drop) then it is desired to energize relay 25 to energize heater 11 and raise the temperature within the area.

As has been explained, transistors 95, 96 and 97 of control amplifier 22 are Class A operated. The output current of transistor 95 increased by virtue of a voltage rise developed across resistor 101, and decreased by virtue of a voltage drop developed across this resistor. As is also apparent from the single figure an increasing output current for transistor 95 is accompanied by and causes a decreasing output current for transistor 97. Likewise, a decreasing output current for transistor 95 causes an increasing output current for transistor 97.

Considering now load resistor 99 which is connected in circuit with the output electrodes of transistor 97, an increasing output current for transistor 97 causes a positive going voltage to appear at the upper terminal of this resistor. Thus, a positive square wave of voltage is applied to capacitor 100. A decreasing output current for transistor 97 causes the voltage of the upper terminal of resistor 99 to move in a negative direction and a negative square wave of voltage to be applied to capacitor 100.

A pair of diodes 114 and 115 are connected in circuit with capacitor 100 and capacitor 23 to effect a charging of capacitor 23 to establish a steady state D.C. voltage on this capacitor. The polarity of this D.C. voltage depends upon the polarity of the pulse of voltage applied to capacitor 23 through capacitor 100. As transistor 97 conducts to a greater extent, and thus develops a positive going voltage at the upper terminal of resistor 99, capacitor 23 is charged with the upper electrode thereof positive. When the conduction of transistor 97 is reducing, the voltage at the upper terminal of resistor 99 moves in a negative direction and the upper plate of capacitor 23 is charged negative.

Capacitor 23 is connected to the input of Schmitt trigger 24. Schmitt trigger 24 includes three transistors 116, 117 and 118. In the well known manner, transistors 116 and 118 are interconnected with transistor 117 such that transistors 116 and 118 are normally non-conductive, or biased to the cut-off state, while transistor 117 is normally conductive and is biased to its saturated region. A negative voltage present at the input of the Schmitt trigger is effective to switch the Schmitt trigger to a second state wherein transistors 116 and 118 driven to saturation and transistor 117 is biased to the cutoff portion of this characteristic. This negative input voltage, which is present at capacitor 23 when the temperature of the area within wall 10 is below the set point temperature, is effective to energize relay 25 and thus complete an energizing circuit for heater 11, connecting this heater to power line conductors 30 and 31.

A positive voltage at the upper plate of capacitor 23, indicative of a high temperature within walls 10, is of a polarity to bias transistor 116 further into cutoff and thus Schmitt trigger 24 does not respond to this positive voltage.

Energization and deenergization of relay 25 is effective to alternate the energization of heaters 45 and 46 contained within the anticipating network 21. Thus, the voltage generated by thermocouple junction 47–48 is effective to place a series aiding or a series opposing voltage in series with the thermocouple voltage present at thermocouple terminals 13 and 14, to anticipate an increasing temperature or a decreasing temperature, respectively, within the area 10.

Cycling switch means 38, and its switch means 40, 41 and 42, is effective to alternately chop both the input and the output of control amplifier 22. As shown, the switch 40–41 shorts output capacitor 100. In the alternate position, switch 40–42 effects a discharge of input capacitor 98. Thus, the input capacitors are cyclically charged and discharged.

From time to time it is necessary to read or to change the control point temperature to be maintained within the area 10. To accomplish this, I provide the push-to-set switch 26.

When it is desired to either read the control point temperature setting on meter 18, or to change this control point temperature setting, the push-to-set switch 26 is actuated. Actuation of this switch opens the circuit to thermocouple terminals 13 and 14 and places the lower portion of the control point setting potentiometer 20 in circuit with the input of amplifier 17. This input circuit can be traced from the emitter electrode 79 of transistor 59 through resistor 78, conductors 77, 76, 75, 121 and 120, push-to-set switch 26, conductor 119, tap 19 of potentiometer 20, resistor 67, conductors 66, 65, and 64, resistor 63, conductors 62 and 61 and capacitor 60 to base electrode 58 of transistor 59. Thus, the voltage rise from tap 19 to terminal 57 of bridge circuit 15 is connected as a positive driving voltage to the base-to-emitter circuit of transistor 59, this voltage being chopped by means of the cycling switch means 38 both at the input and at the output of amplifier 17, to cause meter 18 to read a temperature which is indicative of the control point setting of tap 19 of potentiometer 20. Furthermore, if it is desired to change this control point temperature setting, potentiometer tap 19 is manually adjusted to a new temperature which is then indicated on meter 18.

A release of push-to-set switch 26 again connects thermocouple terminals 13 and 14 in circuit with bridge network 15. The unique construction of my apparatus now provides control of meter 18 by the temperature within the space defined by walls 10, and control of relay 25 by the comparison of this temperature to the control point temperature of control point potentiometer tap 19.

While my explanation had dealt exclusively with the heating of the area within wall 10, it is to be understood that my invention is also applicable to a cooling apparatus. In the case of cooling, the circuit elements of bridge 15 are selected so that the following conditions exist. With the area within wall 10 at ambient or room temperature, the thermocouple voltage at terminals 13 and 14 is again zero. The voltage at bridge output 55 to 57 exists as a voltage rise and meter 18 reads up scale, at a high scale position, to indicate room temperature. In this case however, (as distinguished from the case of heating the area) the voltage at bridge output 55 to 19 also exists as a voltage rise, this voltage rise being of a lower magnitude than that from 55 to 57 by virtue of the opposition voltage drop from terminal 57 to tap 19. This opposition voltage drop is in fact indicative of the temperature below room temperature, to which the area within wall 10 is to be cooled.

Since a voltage rise is now presented to the input of control amplifier 22, relay 25 is deenergized and relay switch means, not shown, will be effective to energize a cooling means to cool the area within wall 10. As the area cools, thermocouple junction 12 cools. As junction 12 is now the cold junction, the thermocouple output voltage at terminals 13 and 14 will be of the reverse polarity to that shown, namely, 13 will be negative and 14 will be positive.

The now existing voltage drop from terminal 14 to terminal 13 will subtract from the bridge output from 55 to 57 and meter 18 reads a lower temperature, below room temperature. Also, the voltage drop from terminal 14 to terminal 13 subtracts from the bridge output from 55 to 19 and as the magnitude of this voltage drop increases (the area is cooled) a point is reached where control amplifier 22 energizes relay 25 to turn off the cooling.

Other modifications of my invention will be apparent to those skilled in the art and it is thus intended that the scope of my invention be limited solely to the scope of the appended claims.

I claim as my invention:

1. A thermocouple temperature indicating and control apparatus; a thermocouple hot junction adapted to be subjected to the temperature which is to be indicated and to be controlled; a source of D.C. voltage; a temperature sensitive bridge network including a temperature sensitive element forming an ambient temperature compensated cold junction having first and second voltage dividers connected in parallel to said source of voltage; first amplifier means having an input and an output; cycling switch means connected to the input and to the output of said first amplifier means to synchronously chop the input and output; a D.C. temperature indicating meter connected to the output of said first amplifier means; circuit means connecting the input of said first amplifier means to a fixed terminal on said first voltage divider and through said hot thermocouple junction to a fixed terminal on said second voltage divider in a manner to place an output voltage of said bridge network in series addition with the voltage of said hot thermocouple junction; second amplifier means having an input and an output; cycling switch means connected to the input and output of said second amplifier means to synchronously chop the input and output; control means adapted to control the temperature of said hot thermocouple junction; and circuit means connecting the input of said second amplifier to a manually variable control point terminal on said first voltage divider and through said hot thermocouple junction to said fixed terminal on said second voltage divider.

2. A thermocouple temperature indicating and control apparatus; a thermocouple junction adapted to be subjected to the temperature which is to be indicated and to be controlled; a source of D.C. voltage; a bridge network having first and second voltage dividers connected in parallel to said source of voltage; first amplifier means having an input and an output; cycling switch means connected to the input and to the output of said first amplifier means to synchronously chop the input and output; a D.C. temperature indicating meter connected to the output of said first amplifier means; circuit means connecting the input of said first amplifier means to a fixed terminal on said first voltage divider and through said thermocouple junction to a fixed terminal on said second voltage divider in a manner to place an output voltage of said bridge network in series with the voltage of said thermocouple junction; second amplifier means having an input and an output; cycling switch means connected to the input and output of said second amplifier means to synchronously chop the input and output; control means adapted to control the temperature of said thermocouple junction; and circuit means connecting the input of said second amplifier to a manually variable control point terminal on said first voltage divider and through said thermocouple junction to said fixed terminal on said second voltage divider.

3. Temperature indicating and control apparatus comprising: a thermocouple hot junction adapted to be subjected to the temperature to be indicated and controlled; a temperature sensitive cold junction bridge circuit including ambient temperature compensating means, a source of regulated D.C. voltage, a first voltage divider connected to said source of voltage having a fixed terminal and a manually variable terminal, and a second voltage divider connected to said source of voltage having a fixed terminal; a D.C. meter calibrated to indicate the temperature of said hot junction, means connecting said meter to the fixed terminal of said second voltage divider and through said hot junction to the fixed terminal of said first voltage divider in a manner to place the voltage between said fixed terminals in series addition to the voltage of the thermocouple; two anticipation thermocouple junctions connected in series, a pair of heaters, one of which is associated with each of said anticipation thermocouple junctions; switching means having means adapted to control the temperature to which said hot junction is subjected; control means connecting said switching means through said series connected anticipation thermocouple junctions to the variable terminal of said first voltage divider and through said hot junction to the fixed terminal of said second voltage divider in a manner to place the voltage between said fixed terminal and said variable terminal in series opposition to the voltage of the thermocouple; and energizing means controlled by said switching means to selectively energize one of said pair of heaters to selectively heat one of said two anticipating thermocouple junctions to provide a voltage therefrom to anticipate a temperature change which will occur at said hot junction.

4. A thermocouple temperature indicating and control apparatus comprising: a thermocouple hot junction adapted to be subjected to a temperature to be indicated and controlled; bridge circuit including circuit connections constituting a thermocouple cold junction, and including circuit impedance elements interconnected to a source of D.C. voltage to provide first and second output terminals of substantially fixed output voltage and third and fourth output terminals of variable output voltage; a D.C. indicating meter, means connecting said meter to said first output terminal and through said hot junction to said second output terminal to cause said meter to indicate the temperature to which said hot junction is subjected; relay means having a winding and switch means controlled thereby; means including said switch means adapted to control the temperature to which said hot junction is subjected; means connecting said relay winding to said third output terminal and through said hot junction to said fourth output terminal to thereby control the energization of said winding in accordance with the temperature of said hot junction as a function of said variable output voltage; and further means selectively controlled to disconnect said hot junction from said meter and to connect said meter to said variable output voltage to selectively indicate the control point to which said variable output voltage is set.

5. Temperature indicating and control apparatus comprising: a source of D.C. voltage, a first voltage divider having a fixed terminal, and a variable terminal, a second voltage divider having a fixed terminal; circuit means connecting said voltage dividers to said source of voltage, a thermocouple hot junction having a first and a second terminal and adapted to be subjected to the temperature to be indicated and controlled; circuit means connecting the first terminal of said hot junction to the fixed terminal of said second voltage divider, a temperature indicating meter, circuit means connecting said meter to the second terminal of said hot junction and to the fixed terminal of said first voltage divider; control means having an output actuator adapted to increase the temperature to which said hot junction is subjected upon energization of said output actuator; means connecting said control means to the second terminal of said hot junction and to the variable terminal of said first voltage divider; and fail safe voltage means including a source of voltage and including a high impedance element connected in parallel with said first and second terminals of said hot junction and effective to cause an indication of a high temperature on said meter and to prevent energization of said actuator upon open circuiting of said hot junction.

6. A thermocouple temperature measuring and control apparatus comprising; a first thermocouple junction adapted to be subjected to a temperature to be measured and controlled, a second thermocouple junction bridge circuit having a first output of a fixed magnitude and a second output of a variable magnitude, temperature measuring means having an input, first means connecting the input of said temperature measuring means in series to said first thermocouple junction and to the first output of said bridge circuit, temperature control means having an input, second means connecting the input of said temperature control means in series to said first thermocouple junction and to the second output of said bridge circuit, and switch means connected to be effective when actuated to connect the second output of said bridge circuit to the input of said temperature measuring means to measure the variable output of said bridge circuit.

7. A thermocouple temperature indicating and control apparatus, comprising; a source of D.C. voltage; a first voltage divider having end terminals and a fixed intermediate terminal; a second voltage divider having end terminals, a fixed intermediate terminal and a variable intermediate terminal; means connecting the end terminals of said first and second voltage dividers to said voltage source in a manner to establish a fixed magnitude voltage rise from the intermediate terminal of said first voltage divider to the fixed intermediate terminal of said second voltage divider, and to establish a variable magnitude voltage from the intermediate terminal of said first voltage divider to the variable intermediate terminal of said second voltage divider; a thermocouple having a sensing junction adapted to be subjected to the temperature to be indicated and controlled, having a second junction, and having first and second output terminals, said output terminals experiencing a thermocouple output voltage which is a voltage rise from said first output terminal to said second output terminal when said sensing junction is at a temperature above the temperature of said second junction, and experiencing a thermocouple output voltage which is a voltage drop when said sensing junction is at a temperature below the temperature of said second junction; temperature indicating means having an input connected to the first output terminal of said thermocouple and to the fixed intermediate terminal of said second voltage divider; and temperature control means having output means adapted to change the temperature of said sensing junction, and having an input connected to the first output terminal of said thermocouple and to the variable intermediate terminal of said second voltage divider, said control means functioning to control the temperature of said sensing junction as determined by said variable voltage from the intermediate terminal of said first voltage divider to the variable intermediate terminal of said second voltage divider.

References Cited by the Examiner

UNITED STATES PATENTS

| | | | |
|---|---|---|---|
| 2,148,491 | 2/1939 | Moore | 236—68 |
| 2,666,889 | 1/1954 | Ehret et al. | 323—66 |
| 2,994,759 | 1/1961 | Lipman | 219—499 |
| 3,082,954 | 3/1963 | Offner | 236—78 |

ALDEN D. STEWART, *Primary Examiner.*